United States Patent
Zhou et al.

(10) Patent No.: US 12,151,746 B2
(45) Date of Patent: Nov. 26, 2024

(54) TRACTOR

(71) Applicant: INTRADIN (SHANGHAI) MACHINERY CO., LTD., Shanghai (CN)

(72) Inventors: Wei Zhou, Shanghai (CN); Junliang Wang, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 432 days.

(21) Appl. No.: 17/579,753

(22) Filed: Jan. 20, 2022

(65) Prior Publication Data

US 2022/0135151 A1 May 5, 2022

(30) Foreign Application Priority Data

Dec. 6, 2021 (CN) .......................... 202123046718.9

(51) Int. Cl.
*B62D 49/02* (2006.01)
*B62D 49/06* (2006.01)

(52) U.S. Cl.
CPC .......... *B62D 49/02* (2013.01); *B62D 49/065* (2013.01); *B62D 49/0664* (2013.01)

(58) Field of Classification Search
CPC .. B62D 49/02; B62D 49/065; B62D 49/0664; B62D 49/007; B62D 53/0864; B60S 13/00; B60D 1/46
See application file for complete search history.

(56) References Cited

U.S. PATENT DOCUMENTS

| | | | | |
|---|---|---|---|---|
| 4,383,681 A * | 5/1983 | Walters | .................... | B66F 7/246 269/69 |
| 5,259,471 A * | 11/1993 | Taylor | .................. | B62D 51/001 180/19.2 |
| 5,511,813 A * | 4/1996 | Kravitz | .................... | B60D 1/42 280/495 |
| 7,845,670 B2 * | 12/2010 | Oberg | ...................... | B60D 1/66 280/47.24 |
| 7,849,943 B1 * | 12/2010 | Ragland | .................. | B60S 13/00 180/215 |
| 7,918,294 B2 * | 4/2011 | Smith | .................... | B62D 51/04 180/19.1 |
| 8,366,136 B2 * | 2/2013 | Svihla | ...................... | B60D 1/44 280/490.1 |
| 9,676,239 B1 * | 6/2017 | Lusty | ..................... | B62D 53/00 |

(Continued)

FOREIGN PATENT DOCUMENTS

CN 108909855 A 11/2018
CN 211442351 U 9/2020

*Primary Examiner* — Mark C Hageman

(57) ABSTRACT

A tractor, including a frame, a power wheel and a connecting assembly. The power wheel is rotatably arranged on a bottom of the frame. The connecting assembly is arranged on the frame and is configured to be attached to a goods carrier. The power wheel is rotatable relative to the frame to drive the frame to move, so as to drive the goods carrier to move synchronously through the connecting assembly. The connecting assembly is configured to move back and forth along a first direction relative to the frame to render a relative position between the goods carrier and the frame adjustable along the first direction. The first direction is a travelling direction of the tractor.

10 Claims, 3 Drawing Sheets

(56) References Cited

U.S. PATENT DOCUMENTS

| | | | |
|---|---|---|---|
| 9,815,508 B1* | 11/2017 | Nesbitt | B62D 51/06 |
| 10,214,401 B2* | 2/2019 | Brunckhorst | B66F 9/18 |
| 2009/0020369 A1* | 1/2009 | Warachka | B66F 9/08 |
| | | | 187/222 |

* cited by examiner

TRACTOR

CROSS-REFERENCE TO RELATED APPLICATIONS

This application claims the benefit of priority from Chinese Patent Application No. 202123046718.9, filed on Dec. 6, 2021. The content of the aforementioned application, including any intervening amendments thereto, is incorporated herein by reference.

TECHNICAL FIELD

This application relates to transportation tools, and more particularly to a tractor.

BACKGROUND

At present, the transfer of goods is often necessary in the industrial production and logistics transportation. In view of the diversity of goods, a variety of carriers are generally needed. But these goods carriers are non-power and require a special tractor for traction.

In the prior art, the relative position between the goods carrier and the tractor cannot be adjusted. If the center of gravity of the goods carrier is far away from the tractor, the gravity center of the tractor will deviate backward such that the tractor will be prone to raising its front end while pulling the goods carrier. On the contrary, if the center of gravity of the goods carrier is close to the tractor, the pressure on the power wheel of the tractor will be lower, which will weaken the friction between the power wheel and the ground such that the tractor will be prone to slippage while pushing the carrier backward. Therefore, the existing tractor still has safety hazards during running.

SUMMARY

Based on this, an object of this disclosure is to provide a tractor, which can safely and reliably tow the goods carrier to move.

Technical solutions of this application are described as follows.

The disclosure provides a tractor, comprising:
a frame;
a power wheel; and
a connecting assembly;
wherein the power wheel is rotatably arranged on a bottom of the frame; the connecting assembly is arranged on the frame and is configured to be attached to a goods carrier; the power wheel is configured to be rotatable relative to the frame to drive the frame to move, so as to drive the goods carrier to move synchronously through the connecting assembly; and the connecting assembly is configured to move back and forth along a first direction relative to the frame to adjust a position of the goods carrier relative to the frame along the first direction; and the first direction is a travelling direction of the tractor.

In an embodiment, the connecting assembly comprises a bearing seat and a connecting component; the bearing seat is arranged on the frame; the connecting component is arranged on the bearing seat and is configured to be attached to the goods carrier; and the bearing seat is configured to move back and forth along the first direction relative to the frame to drive the connecting component to synchronously move back and forth along the first direction relative to the frame to enable the position of the goods carrier relative to the frame to be adjustable along the first direction.

In an embodiment, the connecting assembly further comprises a first locking component; and the first locking component is configured to lock the bearing seat on the frame.

In an embodiment, the bearing seat is provided with a first locking hole; the frame is provided with a plurality of second locking holes arranged spaced apart along the first direction; and the first locking component is configured to sequentially pass through the first locking hole and the plurality of second locking holes to adjust and lock a position of the bearing seat relative to the frame in the first direction.

In an embodiment, the first locking component is a bolt; the connecting assembly further comprises a clamping ring; and the clamping ring is configured to clamp the first locking component when the position of the bearing seat relative to the frame in the first direction is locked via the first locking component, so as to abut against an outer side wall of the bearing seat, thereby limiting disengagement of the first locking component relative to the bearing seat and the frame.

In an embodiment, the connecting component is configured to be lifted or lowered relative to the bearing seat along a second direction perpendicular to the first direction such that a height of the connecting component is adjustable along the second direction.

In an embodiment, the connecting assembly further comprises a second locking component; and the second locking component is configured to lock the connecting component on the bearing seat.

In an embodiment, the connecting component is provided with a third locking hole; the bearing seat is provided with a plurality of fourth locking holes arranged spaced apart along the second direction; the second locking component is configured to sequentially pass through the third locking hole and f the plurality of fourth locking holes to adjust and lock a height of the connecting component relative to the bearing seat in the second direction.

In an embodiment, the tractor further comprises a driving component; the driving component is arranged on the frame and is connected to the power wheel; and the driving component is configured to drive the power wheel to rotate relative to the frame to drive the frame to move, so as to drive the goods carrier to move synchronously via the connecting assembly.

In an embodiment, the tractor further comprises:
a controller; and/or
a power supply;
wherein the controller is arranged on the frame and is electrically connected to the driving component; and the controller is configured to control the driving component to start and stop; and the power supply is arranged on the frame and is electrically connected to the driving component; and the power supply is configured to power the driving component.

Compared to the prior art, the present disclosure has the following beneficial effects.

In the tractor provided herein, the power wheel is rotatable relative to the frame to drive the frame to move such that the goods carrier can be driven to move synchronously through the connecting assembly, enabling the transfer of the goods. Moreover, the connecting assembly can move back and forth along the first direction relative to the frame to allow the relative position between the goods carrier and the frame to be adjustable along the first direction. Hence, in the actual application, when the tractor drags the goods carrier to move forward, the connecting assembly moves toward a front of the frame along the first direction such that the center of gravity of the goods carrier can be close to the front of the frame, thus preventing the front end of the tractor from rising. When the tractor pushes the goods carrier to move backward, the connecting assembly moves along the first direction close to the power wheel such that the gravity of the goods carrier is applied via the connecting assembly to a position of the frame corresponding to the power wheel, so as to increase the pressure on the power wheel, thereby avoiding the slippage of the tractor to make the running of the tractor safer and more reliable.

BRIEF DESCRIPTION OF THE DRAWINGS

In order to more clearly describe the technical solutions in the embodiments of the present application or the prior art, drawings that need to be used in the description of the embodiments or the prior art will be briefly introduced below. Obviously, presented in the drawings are only some embodiments of the present disclosure. For those skilled in the art, other drawings can be obtained according to the drawings provided herein without paying creative effort.

Figure 1:
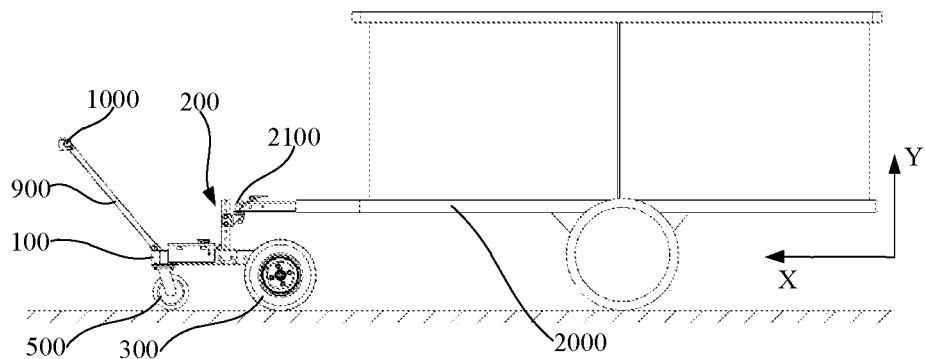
FIG. 1 schematically illustrates attachment of a goods carrier to a tractor according to an embodiment of the present disclosure.

In the drawings: 100, frame; 110, second locking hole; 200, connecting assembly; 210, bearing seat; 211, first locking hole; 212, fourth locking hole; 220, connecting component; 221, third locking hole; 222, accommodating groove; 223, first end face; 224, second end face; 230, first locking component; 240, second locking component; 250, ball joint; 260, clamping ring; 300, power wheel; 400, driving component; 500, steering wheel; 600, decelerator; 700, controller; 800, power supply; 900, push-pull rod; 1000, handle; 1100, control button; 2000, goods carrier; and 2100, ball joint sleeve.

The technical solutions, features, and advantages of this application will be further described below with reference to the drawings.

DETAILED DESCRIPTION OF EMBODIMENTS

The technical solutions of the present application will be clearly and completely described below with reference to the drawings of the embodiments. Obviously, described below are only some embodiments of the present application, which are not intended to limit the disclosure. Based on the embodiments provided herein, other embodiments obtained by those skilled in the art without paying any creative effort shall fall within the scope of this application.

It should be noted that as used herein, all directional terms (such as up, down, left, right, front, back, etc.) are only used to explain the relative position relationship and movement situation between components in a particular posture (as shown in the drawings). If the particular posture changes, the directional indication will change accordingly. In addition, as used herein, the terms "first", "second", etc. are only descriptive and cannot be understood as indicating or implying relative importance or the number of technical features referred to. Therefore, the features defined with "first" and "second" may explicitly or implicitly include at least one of the features. In addition, as used herein, the "and/or" includes three solutions, for example, the "A and/or B" includes A, B, and a combination of A and B. Moreover, the technical solutions of various embodiments can be combined as long as the combined technical solution can be implemented by those skilled in the art. When the combination of technical solutions is contradictory or cannot be achieved, it should be considered that such a combination of technical solutions does not exist, and does not fall into the scope of this application defined by the appended claims.

As shown in FIG. 1, an embodiment of this application provides a tractor, including a frame 100, a power wheel 300, and a connecting assembly 200. The power wheel 300 is rotatably arranged on a bottom of the frame 100. The connecting assembly 200 is arranged on the frame 100 and is configured to be attached to a goods carrier 2000. The power wheel 300 is configured to be rotatable relative to the frame 100 to drive the frame 100 to move, so as to drive the goods carrier 2000 to move synchronously through the connecting assembly 200. The connecting assembly 200 is configured to move back and forth along a first direction relative to the frame 100 to adjust a position of the goods carrier 2000 relative to the frame 100 along the first direction, where the first direction is a travelling direction of the tractor, namely, a moving direction of the frame 100. Referring to FIG. 1, the first direction is an X-axis direction.

The power wheel 300 is rotatable relative to the frame 100 to drive the frame 100 to move such that the goods carrier 2000 can be driven to move synchronously through the connecting assembly 200, enabling the transfer of the goods. Moreover, the connecting assembly 200 can move back and forth along the first direction relative to the frame 100 to allow the relative position between the goods carrier 2000 and the frame 100 to be adjustable along the first direction. Hence, in the actual application, when the tractor drags the goods carrier 2000 to move forward, the connecting assembly 200 moves toward a front of the frame 100 along the first direction such that the center of gravity of the goods carrier 2000 can be close to the front of the frame 100, thus preventing the front end of the tractor from rising. When the tractor pushes the goods carrier 2000 to move backward, the connecting assembly 200 moves along the first direction close to the power wheel 300 such that the gravity of the goods carrier 2000 is applied via the connecting assembly 200 to a position of the frame 100 corresponding to the power wheel 300, so as to increase the pressure on the power wheel 300, thereby avoiding the slippage of the tractor to make the running of the tractor safer and more reliable.

As shown in FIG. 1, the power wheel 300 is rotatably arranged on a rear side of the bottom of the frame 100. In an embodiment, when the tractor pushes the goods carrier 2000 to move backward, the connecting assembly 200 moves along the first direction close to a rear portion of the frame 100 such that the gravity center of the goods carrier 2000 is applied via the connecting assembly 200 to the rear portion of the frame 100, so as to enhance the pressure on the power wheel 300 arranged on the rear side of the bottom of the frame 100, thereby avoiding the slippage of the tractor.

Figure 2:
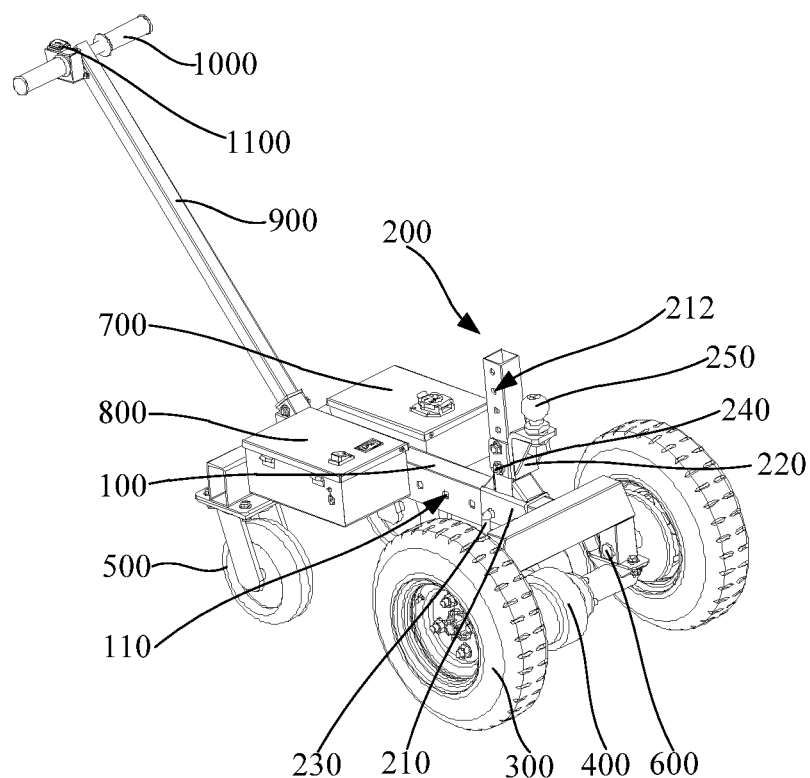
FIG. 2 is a structural diagram of the tractor according to an embodiment of the present disclosure.
Figure 3:
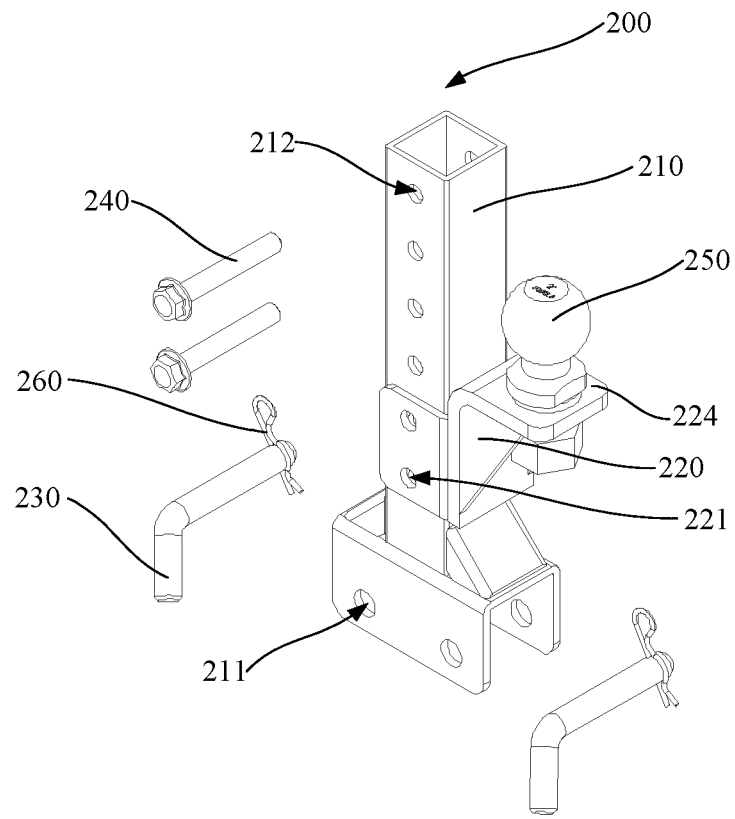
FIG. 3 is an exploded view of a connecting assembly according to an embodiment of the present disclosure.
Figure 4:
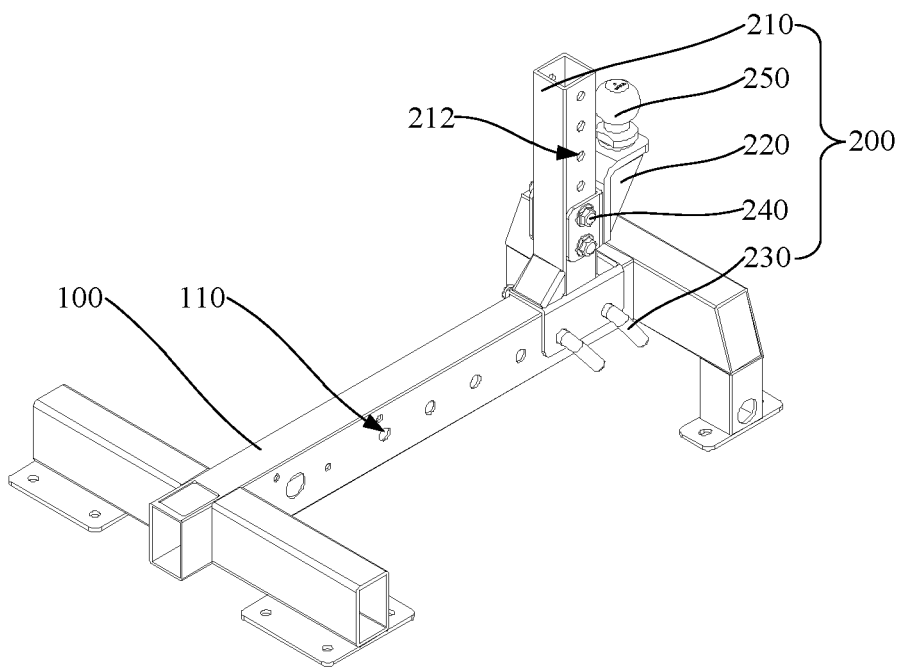
FIG. 4 schematically shows assembly of the connecting assembly and a frame according to an embodiment of the present disclosure.

As shown in FIGS. 2-4, the connecting assembly 200 includes a bearing seat 210 and a connecting component 220. The bearing seat 210 is arranged on the frame 100. The connecting component 220 is arranged on the bearing seat 210 and is configured to be attached to the goods carrier 2000. The bearing seat 210 is configured to move back and forth along the first direction relative to the frame 100 to drive the connecting component 220 to synchronously move back and forth along the first direction relative to the frame 100 to enable the position of the goods carrier 2000 relative to the frame 100 to be adjustable along the first direction.

As shown in FIGS. 2-4, the connecting assembly 200 further includes a first locking component 230. The first locking component 230 is configured to lock the bearing seat 210 on the frame 100. In an embodiment, when the bearing seat 210 is configured to adjust a position of the connecting component 220 relative to the frame 100 along the first direction, the first locking component 230 unlocks the bearing seat 210 such that the bearing seat 210 drives the connecting component 220 to move back and forth along the first direction relative to the frame 100. When the connecting component 220 is adjusted to a desired position via the bearing seat 210, the first locking component 230 locks the bearing seat 210 on the frame 100, so as to prevent the bearing seat 210 from moving relative to the frame 100, thereby facilitating the synchronous movement of the goods carrier 2000 driven by the frame 100 via the bearing seat 210 and the connecting component 220.

As shown in FIGS. 2-4, the bearing seat 210 is provided with a first locking hole 211. The frame 100 is provided with a plurality of second locking holes 110 arranged spaced apart along the first direction. The first locking component 230 is configured to sequentially pass through the first locking hole 211 and the plurality of second locking holes 110 to adjust and lock the position of the bearing seat 210 relative to the frame 100 in the first direction.

In an embodiment, when the position of the bearing seat 210 relative to the frame 100 needs to be adjusted, the bearing seat 210 is driven to move back and forth along the first direction relative to the frame 100, so as to align one of the plurality of second locking holes 110 with the first locking hole 211. After that, the first locking component 230 sequentially passes through the first locking hole 211 and the one of the plurality of second locking holes 110 to lock the bearing seat 210 such that the bearing seat 210 is retained at a desired position.

As shown in FIGS. 3-4, multiple first locking holes 211 are arranged, and the multiple first locking holes 211 can be respectively aligned with the plurality of second locking holes 110 at the same time. Multiple first locking components 230 are arranged, and the multiple first locking components 230 are in one-to-one correspondence to the multiple first locking holes 211. The arrangement of the multiple first locking components 230 and the multiple first locking holes 211 can make the locking of the bearing seat 210 on the frame 100 more reliable.

In this embodiment, the number of the first locking hole 211 is less than that of the second locking holes 110. In an embodiment, the number of the first locking hole 211 is two. The bearing seat 210 can move back and forth along the first direction relative to the frame 100 such that the two first locking holes 211 can be respectively aligned with two second locking holes 110. The number of the first locking component 230 is two, and the two first locking components 230 are in one-to-one correspondence to the two first locking holes 211.

As shown in an embodiment illustrated in FIG. 3, The first locking component 230 is a bolt. The connecting assembly 200 further includes a clamping ring 260. The clamping ring 260 is configured to clamp the first locking component 230 when the position of the bearing seat 210 relative to the frame 100 in the first direction is locked via the first locking component 230, so as to abut against an outer side wall of the bearing seat 210, thereby limiting disengagement of the first locking component 230 relative to the bearing seat 210 and the frame 100.

The connecting component 220 is configured to be lifted or lowered relative to the bearing seat 210 along a second direction perpendicular to the first direction such that a height of the connecting component 220 is adjustable along the second direction. In an embodiment, the connecting component 220 is height-adjustable to be attached to the goods carrier 2000 with different heights, thereby improving the applicability of the tractor. Specifically, referring to FIG. 1, the second direction is a Y-axis direction.

As shown in FIGS. 1-2, the connecting assembly 200 further includes a second locking component 240 configured to lock the connecting component 220 on the bearing seat 210. In an embodiment, when the height of the connecting component 220 needs to be adjusted, the second locking component 240 unlocks the connecting component 220 to allow the connecting component 220 to be lifted along the second direction relative to the bearing seat 210. After the connecting component 220 is lifted to a desired height, the connecting component 220 is locked on the bearing seat 210 via the second locking component 240 to prevent the connecting component 220 from moving relative to the bearing seat 210.

As shown in FIGS. 2-3, the connecting component 220 is provided with a third locking hole 221. The bearing seat 210 is provided with a plurality of fourth locking holes 212 arranged spaced apart along the second direction. The second locking component 240 can sequentially pass through the third locking hole 221 and the plurality of fourth locking holes 212 to adjust and lock a height position of the connecting component 220 relative to the bearing seat 210 in the second direction. In an embodiment, the second locking component 240 is a threaded fastener.

In an embodiment, when the height of the connecting component 220 needs to be adjusted, the connecting component 220 is driven to be lifted or lowered along the second direction relative to the bearing seat 210 to align a fourth locking hole 212 with the third locking hole 221 at a desired height. After that, the second locking component 240 can sequentially passes through the third locking hole 221 and the fourth locking hole 212 to lock the connecting component 220 on the bearing seat 210 such that the connecting component 220 is retained at the desired height.

As shown in FIG. 3, multiple third locking hole 221 are arranged, and the multiple third locking holes 221 can be respectively aligned with the plurality of fourth locking holes 212 at the same time. Multiple second locking component 240 are arranged, and the multiple second locking components 240 are in one-to-one correspondence to the multiple third locking holes 221. The arrangement of the multiple second locking components 240 and the multiple third locking holes 221 can make the locking of the connecting component 220 on the bearing seat 210 more reliable.

In this embodiment, the number of the third locking hole 221 is less than that of the fourth locking hole 212. In an embodiment, the number of the third locking hole 221 is two. The connecting component 220 is configured to move back and forth along the second direction relative to the bearing seat 210 such that the two third locking hole 221 can be respectively aligned with two fourth locking holes 212. The number of the second locking components 240 is two, and the two second locking components 240 are in one-to-one correspondence to the two third locking hole 221.

As shown in FIGS. 1-2, the connecting assembly 200 further includes a ball joint 250 arranged on the connecting component 220. The goods carrier 2000 is provided with a ball joint sleeve 2100. The ball joint sleeve 2100 can be engaged with the ball joint 250 to achieve a connection between the connecting assembly 200 and the goods carrier 2000.

Figure 5:
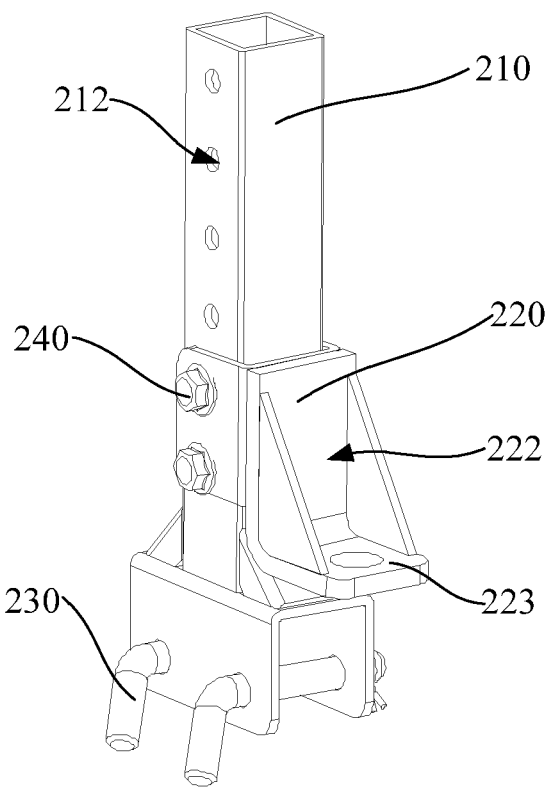
FIG. 5 schematically depicts assembly of a bearing seat, a connecting component, a first locking component, and a second locking component according to an embodiment of the present disclosure.

As shown in FIG. 5, the connecting component 220 is provided with a accommodating groove 222. The accommodating groove 222 is configured to accommodate the ball joint 250 to achieve the fixing of the ball joint 250 relative to the connecting component 220.

Figure 6:
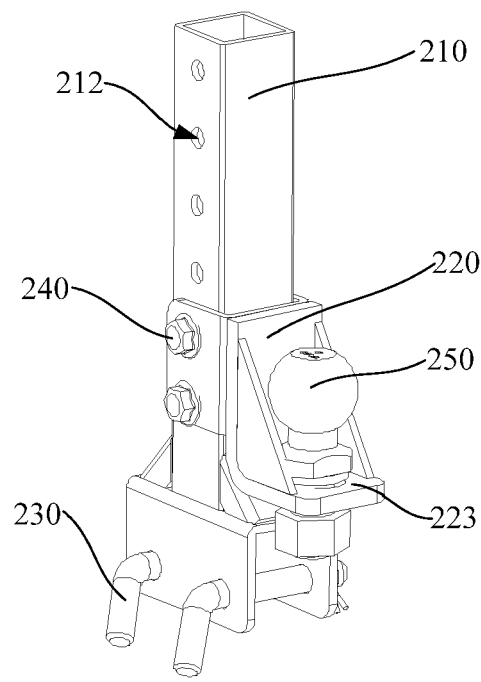
FIG. 6 is a structural diagram of the connecting assembly according to another embodiment of the present disclosure.

Referring to an embodiment shown in FIGS. 3 and 5-6, the connecting component 220 is provided with a first end face 223 and a second end face 224 opposite to each other. The first end face 223 is a bottom surface of the accommodating groove 222. The connecting component 220 is detachably connected to the bearing seat 210. After the connecting component 220 is detached from the bearing seat 210, the connecting component 220 can be reversed 180° up and down relative to the bearing seat 210 to allow the first end face 223 or the second end face 224 of the connecting component 220 to face upward. When the first end face 223 of the connecting component 220 faces upward, the ball joint 250 is arranged on the first end face 223 of the connecting component 220, and at this time, the ball joint 250 is accommodated in the accommodating groove 222. When the second end face 224 of the connecting component 220 faces upward, the ball joint 250 is arranged on the second end face 224 of the connecting component 220. In an embodiment, the connecting component 220 is removed from the bearing seat 210 after being unlocked via the second locking component 240.

Referring to FIGS. 3 and 6, in the actual operation, if the height of the third locking hole 221 of the connecting component 220 is unchanged relative to the bearing seat 210, the connecting component 220 will be reversed 180° up and down. In this case, the height of the ball joint 250 while the first end face 223 of the connecting component 220 facing upwards is 10-20 cm lower than the height of the ball joint 250 while the second end face 224 of the connecting component 220 facings upwards, so as to broaden the height adjustment range of the ball joint 250 relative to the bearing seat 210, thus enabling the ball joint 250 to adapt to the goods carriers 2000 with different heights.

As shown in an embodiment illustrated in FIG. 2, the tractor further includes a driving component 400. The driving component 400 is arranged on the frame 100 and is connected to the power wheel 300. The driving component 400 is configured to drive the power wheel 300 to rotate relative to the frame 100 to drive the frame 100 to move, so as to drive the goods carrier 2000 to move synchronously via the connecting component. In this embodiment, the driving component 400 is a motor.

As shown in FIG. 2, two power wheels 300 are arranged spaced apart at the rear side of the bottom of the frame 100. The driving component 400 is connected to the two power wheels 300 and is configured to drive the two power wheels 300 to rotate relative to the frame 100, so as to drive the frame 100 to move.

As shown in an embodiment illustrated in FIG. 2, the tractor further includes a steering wheel 500. The steering wheel 500 is rotatably arranged on a front side of the bottom of the frame 100. The driving component 400 can drive the power wheel 300 to rotate relative to the frame 100 to drive the frame 100 to move, so as to drive the steering wheel 500 to rotate through the frame 100. An external force can be applied to change an angle between the steering wheel 500 and the power wheel 300 to enable the moving direction of the frame 100 to be adjustable.

In this embodiment, the connecting assembly 200 arranged on the frame 100 is located between the steering wheel 500 and the power wheel 300. The connecting assembly 200 can move back and forth relative to the frame 100 between the steering wheel 500 and the power wheel 300 along the first direction to enable the relative position between the goods carrier 2000 and the frame 100 to be adjustable along the first direction.

As shown in FIG. 2, two steering wheels 500 are arranged spaced apart at the front side of the bottom of frame 100. The driving component 400 is configured to drive the two power wheels 300 to rotate relative to the frame 100 to drive the frame 100 to move, so as to drive the two steering wheels 500 to rotate through the frame 100.

As shown in FIG. 2, the driving component 400 is a motor. The tractor further includes a decelerator 600. The decelerator 600 is rotatably arranged on the frame 100 and is in transmission connection with the driving component 400. The decelerator 600 is connected to the power wheel 300, and is configured to reduce an output speed of the driving component 400 to drive the power wheel 300 to rotate at a reduced speed. Specifically, the arrangement of the decelerator 600 enables the frame 100 to move more smoothly and stably.

In an embodiment, two decelerators 600 are arranged spaced apart on the frame 100 rotatably. The driving component 400 is in transmission connection with the two decelerators 600. The two decelerators 600 are in one-to-one correspondence to the two power wheels 300.

In this embodiment, the driving component 400 is a motor. The motor is provided with a first gear portion. Each of the two decelerators 600 is provided with a second gear portion. The motor is engaged with each of the two decelerators 600 through the first gear portion and the second gear portion. The number of teeth of the second gear portion is greater than that of the first gear portion. Therefore, when the motor drives the two decelerators 600 to rotate, the speed of the two decelerators 600 is less than that of the motor such that the two decelerators 600 can drive the two power wheels 300 to rotate at a smaller speed.

As shown in FIG. 2, the tractor in an embodiment further includes a controller 700. The controller 700 is arranged on the frame 100 and is electrically connected to the driving component 400. The controller 700 is configured to control the driving component 400 to start and stop.

In an embodiment, the controller 700 is also configured to adjust the rotating direction of the two power wheels 300 through the driving component 400. Specifically, the controller 700 drives the two power wheels 300 to rotate forward or reversely through the driving component 400, so as to drive the frame 100 to move forward or backward. In this embodiment, the driving component 400 is a motor, and the controller 700 can control the motor to rotate forward or reversely to drive the two power wheels 300 to rotate forward or reversely, so as to drive the frame 100 to move forward or backward.

As shown in FIG. 2, the tractor in an embodiment further includes a power supply 800. The power supply 800 is arranged on the frame 100 and is electrically connected to the driving component 400. The power supply 800 is configured to power the driving component 400.

In an embodiment, the power supply 800 is electrically connected to the controller 700 and is configured to power the controller 700, so as to power the driving component 400 through the controller 700.

As shown in an embodiment illustrated in FIG. 2, the tractor further includes a push-pull rod 900 provided on the frame 100. In the actual application, the push-pull rod 900 is controlled to avoid deflection of the moving direction of the frame 100. When the moving direction of the frame 100 needs to be adjusted, a force toward a desired direction can be directly applied to the push-pull rod 900 to deflect the moving direction of the frame 100 toward the desired direction.

As shown in an embodiment illustrated in FIG. 2, the tractor further includes two handles 1000 arranged on the push-pull rod 900. Specifically, the two handles 1000 are convenient for holding.

As shown in FIG. 2, the two handles 1000 are arranged spaced apart on the push-pull rod 900 for holding with both hands.

As shown in an embodiment illustrated in FIG. 2, the tractor further includes a control button 1100. The control button 1100 is arranged on the handle 1000 and is electrically connected to the controller 700. The control button 1100 is configured to control the driving component 400 to start and stop through the controller 700.

In an embodiment, the control button 1100 is also configured to adjust the rotating direction of the two power wheels 300 through the controller 700.

Described above are only preferred embodiments of this application, which are not intended to limit the scope of this application. It should be understood that any variations, modifications and replacements made by those skilled in the art without departing from the spirit of the disclosure should fall within the scope of the disclosure defined by the appended claims.

What is claimed is:

1. A tractor, comprising:
   a frame;
   a power wheel; and
   a connecting assembly;
   wherein the power wheel is rotatably arranged on a bottom of the frame; the connecting assembly is arranged on the frame and is configured to be attached to a goods carrier; the power wheel is configured to be rotatable relative to the frame to drive the frame to move, so as to drive the goods carrier to move synchronously through the connecting assembly;
   the connecting assembly is configured to move back and forth along a first direction relative to the frame to adjust a position of the goods carrier relative to the frame along the first direction; and the first direction is a travelling direction of the tractor;
   the connecting assembly comprises a ball joint, a bearing seat and a connecting component; the bearing seat is arranged on the frame; the connecting component is arranged on the bearing seat and is configured to be attached to the goods carrier; the connecting component is provided with a first end face and a second end face opposite to each other; the connecting component is configured to be reversed 180° up and down relative to the bearing seat to allow the first end face or the second end face of the connecting component to face upward; when the first end face of the connecting component faces upward, the ball joint is arranged on the first end face of the connecting component; when the second end face of the connecting component faces upward, the ball joint is arranged on the second end face of the connecting component; and
   a height of the ball joint while the first end face of the connecting component facing upwards is lower than a height of the ball joint while the second end face of the connecting component facings upwards.

2. The tractor of claim 1, wherein the bearing seat is configured to move back and forth along the first direction relative to the frame to drive the connecting component to synchronously move back and forth along the first direction relative to the frame to enable the position of the goods carrier relative to the frame to be adjustable along the first direction.

3. The tractor of claim 2, wherein the connecting assembly further comprises a locking component; and the locking component is configured to lock the bearing seat on the frame.

4. The tractor of claim 3, wherein the bearing seat is provided with a first locking hole; the frame is provided with a plurality of second locking holes arranged spaced apart along the first direction; and the first locking component is configured to sequentially pass through the first locking hole and the plurality of second locking holes to adjust and lock a position of the bearing seat relative to the frame in the first direction.

5. The tractor of claim 4, wherein the first locking component is a bolt;
   the connecting assembly further comprises a clamping ring; and the clamping ring is configured to clamp the first locking component when the position of the bearing seat relative to the frame in the first direction is locked via the first locking component, so as to abut against an outer side wall of the bearing seat, thereby limiting disengagement of the first locking component relative to the bearing seat and the frame.

6. The tractor of claim 2, wherein the connecting component is configured to be lifted or lowered relative to the bearing seat along a second direction perpendicular to the first direction such that a height of the connecting component is adjustable along the second direction.

7. The tractor of claim 6, wherein the connecting assembly further comprises a locking component; and the locking component is configured to lock the connecting component on the bearing seat.

8. The tractor of claim 7, wherein the connecting component is provided with a first locking hole; the bearing seat is provided with a plurality of second locking holes arranged spaced apart along the second direction; the locking component can sequentially pass through the first locking hole and the plurality of second locking holes to adjust and lock a height position of the connecting component relative to the bearing seat in the second direction.

9. The tractor of claim 1, further comprising:
   a driving component;
   wherein the driving component is arranged on the frame and is connected to the power wheel; and the driving component is configured to drive the power wheel to rotate relative to the frame to drive the frame to move, so as to drive the goods carrier to move synchronously via the connecting assembly.

10. The tractor of claim 9, further comprising:
    a controller; and/or a power supply;

wherein the controller is arranged on the frame and is electrically connected to the driving component; and the controller is configured to control the driving component to start and stop; and the power supply is arranged on the frame and is electrically connected to the driving component; and the power supply is configured to power the driving component.

\* \* \* \* \*